(12) United States Patent
Bugovics

(10) Patent No.: US 11,933,602 B2
(45) Date of Patent: *Mar. 19, 2024

(54) VEHICLE DETECTION SYSTEM

(71) Applicant: TWINNER GMBH, Halle (DE)

(72) Inventor: Jozsef Bugovics, Leipzig (DE)

(73) Assignee: Twinner GmbH, Halle (DE)

( * ) Notice: Subject to any disclaimer, the term of this patent is extended or adjusted under 35 U.S.C. 154(b) by 764 days.

This patent is subject to a terminal disclaimer.

(21) Appl. No.: 17/043,279

(22) PCT Filed: Mar. 26, 2019

(86) PCT No.: PCT/DE2019/000082
§ 371 (c)(1),
(2) Date: Sep. 29, 2020

(87) PCT Pub. No.: WO2019/185075
PCT Pub. Date: Oct. 3, 2019

(65) Prior Publication Data
US 2021/0035169 A1    Feb. 4, 2021

(30) Foreign Application Priority Data

Mar. 29, 2018 (DE) .................. 10 2018 002 621.4
Mar. 29, 2018 (DE) .................. 20 2018 001 659.4

(51) Int. Cl.
*G01B 11/25* (2006.01)
*G01B 11/24* (2006.01)
(Continued)

(52) U.S. Cl.
CPC .......... *G01B 11/2513* (2013.01); *G01B 11/24* (2013.01); *G01N 21/8806* (2013.01);
(Continued)

(58) Field of Classification Search
None
See application file for complete search history.

(56) References Cited

U.S. PATENT DOCUMENTS 10,319,094 B1 * 6/2019 Chen ................... G06N 3/08
2007/0146728 A1   6/2007 Pristner
2014/0112573 A1   4/2014 Francis, Jr. et al.

FOREIGN PATENT DOCUMENTS

DE    202013000050 U1   2/2013
DE    102015204473 A1   9/2016
(Continued)

*Primary Examiner* — Ariel J Yu
(74) *Attorney, Agent, or Firm* — Laurence A. Greenberg; Werner H. Stemer; Ralph E. Locher

(57) ABSTRACT

A vehicle state detection system includes an vehicle positioning unit, an object detection unit, and an evaluation unit. The vehicle positioning unit has a rotatable platform and a platform position detection unit. The object detection unit includes two individual detection systems which each have a detection area. A positioning unit defines a positional relation of the individual detection systems to one another. The two individual detection systems detect object data of object points of the vehicle and provide the object data the evaluation unit. The evaluation unit includes respective evaluation modules for each of the at least two individual detection systems, an overall evaluation module and a generation module.

8 Claims, 2 Drawing Sheets

(51) Int. Cl.
    *G01N 21/88*     (2006.01)
    *G01S 17/89*     (2020.01)
    *G06F 16/538*    (2019.01)
    *G06F 18/25*     (2023.01)
    *G06Q 10/0875*   (2023.01)
    *G06Q 10/20*     (2023.01)
    *G06Q 30/02*     (2023.01)
    *G06T 7/00*      (2017.01)
    *G06T 7/73*      (2017.01)
    *G07C 5/08*      (2006.01)

(52) U.S. Cl.
    CPC ............ *G01S 17/89* (2013.01); *G06F 16/538* (2019.01); *G06F 18/25* (2023.01); *G06Q 10/0875* (2013.01); *G06Q 10/20* (2013.01); *G06Q 30/0278* (2013.01); *G06T 7/0002* (2013.01); *G06T 7/73* (2017.01); *G07C 5/0841* (2013.01); *G01N 2021/8829* (2013.01); *G06T 2207/30168* (2013.01); *G06T 2207/30252* (2013.01); *G06V 2201/08* (2022.01)

(56) References Cited

FOREIGN PATENT DOCUMENTS

| | | | |
|---|---|---|---|
| DE | 102017210558 B3 * | 11/2018 | ......... G01B 11/2513 |
| DE | 102017117614 A1 * | 2/2019 | ......... G01B 11/2513 |
| EP | 1464920 A1 | 10/2004 | |
| FR | 2945619 A1 | 11/2010 | |
| WO | WO-2018061613 A1 * | 4/2018 | ............. B60R 21/00 |
| WO | WO-2018206527 A1 * | 11/2018 | ......... G01B 11/2513 |

* cited by examiner

VEHICLE DETECTION SYSTEM

BACKGROUND OF THE INVENTION

Field of the Invention

The invention relates to a vehicle detection system for generating a n-dimensional digital image of the vehicle to be detected.

From the state of the art it is basically known how to record vehicles according to special parameters, for example to determine their outer geometry or to record them photographically.

DE 20 2013 000 050 U1, for example, shows a solution in which scanner arms adapted to the basic shape of a vehicle are positioned such that they can be moved linearly and at the same time swiveled to detect the surface of the vehicle. According to the task definition, a three-dimensional surface can thus be detected. This device is not designed to simultaneously identify properties of different categories or to measure different surface types.

SUMMARY OF THE INVENTION

The task of the invention is to present a failure-insensitive and easy-to-operate solution for the complex detection of a vehicle with as little personnel expenditure as possible.

The task is solved by the features listed in independent claim. Preferred further developments result from the subclaims.

According to the invention, the vehicle state detection system comprises a vehicle positioning unit, an object detection unit and an evaluation unit as basic components.

The vehicle positioning unit comprises a platform and a platform position detection unit.

The size and load capacity of the platform are such that a vehicle can be placed on it. The vehicle itself is not part of the device of the invention. Vehicles in this sense are land vehicles, especially passenger cars. The platform is designed to rotate. The rotation axis of the platform corresponds to the vertical axis of the positioned vehicle so that the platform is substantially arranged horizontally. Thus, the platform preferably corresponds to the design of a rotary table.

The platform position detection unit is such that it can be used for detecting platform position data. The platform position data describe the describe the angular position of the rotating platform and thus indirectly the angular position of the placed vehicle. If the platform is rotated during a detection process, object points of the vehicle, having different spatial coordinates at different angular positions, can be assigned to each other. The platform position data are provided to the evaluation unit in a transmittable manner. For transmitting the platform position data, the vehicle positioning unit and the evaluation unit are data-linked.

The object detection unit comprises individual detection systems. According to the invention, the object detection unit comprises a number of at least two individual detection systems from a group consisting of:
- 3D camera detection system
- image camera detection system
- infrared detection system
- laser triangulation detection system
- pattern projection detection system
- deflectometry detection system.

All individual detection systems provide spatial coordinate data of the vehicle's object points. The spatial coordinate data of all individual detection systems of the object detection unit are related to one and the same spatial coordinate system. For this purpose, the individual detection systems are calibrated for the same spatial coordinate system. In the following, this is also referred to as uniform spatial coordinate system.

The object detection unit preferably has more than two of the listed individual detection systems, preferably at least three of the individual detection systems, especially preferably more than three of the individual detection systems.

Depth camera systems, in particular in the form of TOF systems (Time of Flight), and stereo camera systems are used in particular as 3D camera detection system. With the help of 3D camera detection systems, spatial coordinates of object points can be detected as object data.

The image camera detection systems are above all color camera systems such that brightness and color values of object points can be detected as object data. In this way, the external appearance of the vehicle in particular can be detected.

Infrared detection systems are based on thermography and feature infrared cameras that receive the infrared radiation emitted by an object point as object data. The infrared detection system can be passive, i.e. without prior exposure of the vehicle to infrared radiation, or active, i.e. with prior exposure of the vehicle to infrared radiation. By means of an infrared detection system, damage and in particular overpainting under the surface of the vehicle paint can be detected.

A laser triangulation detection system projects a laser dot onto the vehicle surface and has a camera being spaced from the laser source for optical detection of the laser dot, wherein the angle of the laser dot is evaluated trigonometrically and thus the distance of the object point corresponding to the laser dot can be determined. Thus, as a complement to a 3D camera detection system, spatial coordinates of the vehicle's object points can be detected as object data.

A pattern light projection detection system, also referred to as pattern projection, projects a light pattern onto the vehicle surface. Strip light projection is an important example. But dot patterns, for example, are also possible. A strip light projection detection system projects a light strip on the vehicle surface. The camera being spaced from the laser source detects the projected light strips. With the help of the angle and trigonometric evaluation, the spatial coordinate data of the points of the light strips are determined. As with laser triangulation, spatial coordinates of the vehicle's object points can be detected as object data as a complement to a 3D camera detection system.

Using a deflectometry detection system, the reflections of known patterns are evaluated to determine the shape of an object surface. A deflectometry detection system is suitable for reflective surfaces. Thanks to a deflectometry detection system, spatial coordinate data of object points of the windows or other high-gloss surfaces of the vehicle such as chrome trim elements can be detected as object data.

Each of the individual detection systems has a detection area. The detection area covers at least sections of the vehicle. The detection areas of the individual detection systems overlap and form a common detection area. The platform is positioned in such that a placed vehicle is at least partially within the common detection area.

By means of the vehicle positioning unit the vehicle is rotated. Detections are carried out sequentially such that the platform and thus the vehicle are detected at a variety of different angular positions.

The object detection unit also has a positioning unit. The positioning unit establishes a fixed positional relationship between the different individual detection systems as well as between the individual detection systems and the vehicle positioning unit. It is preferably a rack or frame. The positioning unit can also be formed as a housing.

Furthermore, markings are positioned in the common detection area to enable calibration of the individual detection systems into the same uniform spatial coordinate system. Preferably, the markings are placed at the inside of a housing.

The object detection unit is further characterized in that object data of object points of the vehicle can be detected and provided in a manner transmittable to the evaluation unit by means of each of the at least two individual detection systems. The object data contain, partly additionally, coordinate data of the object points. Depending on the individual detection system, the coordinate data can be available as spatial coordinate data (x, y, z) or as two-dimensional coordinate data (x, y).

The evaluation unit comprises individual evaluation modules, an overall evaluation module and a generation module.

The evaluation unit receives the object data from the object detection unit and the platform position data from the vehicle positioning unit.

The evaluation unit has an individual evaluation module for each individual detection system. The respective individual evaluation module performs an evaluation of the detection quality of the object data. It performs the evaluation of the object data, which are present at a defined coordinate point at a defined detection angle. The coordinate point is defined by the coordinate data of the individual detection system and the detection angle by the platform position data. On the basis of the evaluation, a precategorization of these object data is performed with the help of an adjustable quality value. If the object data achieve the adjustable quality value, they are precategorized as usable object data. If the object data fall below the adjustable quality value, they are precategorized as non-usable object data. The adjustable quality value can be defined, for example, through permissible deviations from adjacent object points.

The object data from this detection relating to this specific object point are included into the overall evaluation from all detections for this object point both in relation to all detection angles and in relation to all dimensions. A dimension is always considered to be a type of object data and of information obtained in this way.

The evaluation by the individual evaluation module is thus carried out for each object point and for each individual detection process performed for this object point.

The individual evaluation module is considered to be a functional category so that a sequential processing of the object data of different individual detection systems by the same unit with subsequent intermediate storage is also considered to be an individual evaluation module per individual detection system. The detections of the different individual detection systems and the subsequent evaluation of the object data by individual evaluation modules can—depending on the specific form—also be carried out in parallel.

The individual evaluation modules deliver the usable object data in a transmittable manner to the overall evaluation module.

By means of the overall evaluation module, the usable object data from the individual evaluation modules and thus from the individual detection systems are assigned to each other on the basis of the coordinate data of the object points.

The overall evaluation module is designed such that the quality value of the usable object data of an individual detection system can be compared to the quality value of the usable object data of another individual detection system. On this basis, an object-point-related ranking categorization of the usable object data of the individual detection systems as primary object data and as secondary object data is feasible depending on the quality value. The object data for a specific object point with the highest quality value are categorized as primary object data. The object data for this specific object point with the lowest quality value are categorized as secondary object data. An object point may have several secondary object data from different individual detection systems, while primary object data for an object point may only exist once. The primary object data and the secondary object data are made available to the generation module in a transmittable manner.

The ranking categorization is thus based on an evaluation of the quality of the object data based on the quality value. The evaluation of the quality can be absolute or relative to the recorded data quality of the object data. Apart from discrete algorithms, algorithms including an "n-to-n" relation in the quality evaluation can also be used. Thus it is possible to increase the resulting quality of the object data even with a low quality of the object data from an individual detection by using the object data from several detection angles and the object data from several different individual detection systems each of them relating to the same object point.

If, according to a preferred variant, at least three individual detection systems are available each providing object data, the overall evaluation module can perform a plausibility check in such a way that the object data from the at least three individual detection systems detected for a specific object point are compared and that, as of an adjustable degree of deviation of the object data of a first individual detection system from the object data of the further at least two individual detection systems, the object data of the first individual detection system are discarded and are no longer made available to the generation module in a transmittable manner.

The generation module is designed to assign the coordinate data from the object data of the individual detection systems to a uniform spatial coordinate system, taking the platform position data into consideration. Different angular positions of the platform result in different coordinate data of the object data of one and the same object point of the vehicle. Nevertheless a clear assignment of all object data, which refer to one and the same object point, can be performed for this object point, since the evaluation unit knows the platform coordinate data in addition. On the basis of the primary object data, a basic digital image of the vehicle is first generated in the uniform spatial coordinate system. The primary object data thus have a key function.

The basic digital image generated in this way is initially only based on the coordinate data as well as on the further data which are part of the primary object data.

The basic digital image of the vehicle is now supplemented by the generation module by adding the secondary object data with the help of the coordinate data to form a digital image of the vehicle. The digital image is provided ready for output.

As a special advantage, the vehicle state detection system enables the generation of a uniform digital image of a vehicle on the basis of several individual detection systems.

Thus, object data from different individual detection systems are available for one and the same object point, which is also called multi-layer information.

On the one hand, the individual detection systems can advantageously support each other. This can in particular be the case for determining the spatial coordinate data by using, for example, the object data from a 3D camera detection system for the opaque sections of the vehicle, such as the painted surface and, for example, the object data from a deflectometry detection system for the glazed sections of the vehicle, such as the windows. Another advantage is that the vehicle state detection system automatically determines the quality and thus the suitability of the object data from different individual detection systems and uses the object data resulting in a higher quality of the digital image.

Furthermore, the object data of the individual detection systems can be in cumulative assignment to each other, for example by supplementing the object data from an individual image camera detection system with the object data from an individual infrared system, and thus hidden damages that have been covered by overpainting can be made visible. For example, an object point can be shown as an overpainted representation and the surface under the paint at the same object point can simultaneously be revealed to the viewer.

As a further advantage, the digital image enables to display the vehicle in different views, for example with the doors closed or open, and in different perspectives, for example as a 360° view.

A particular advantage is that the result is a digital image of the vehicle that has a sufficient database, especially for the following two important applications.

Firstly, the digital image is suitable for detecting vehicle damage and automatically determining the necessary repair measures, specifying the required spare parts and necessary work steps, and the resulting repair costs, whereby everything can be done in digital form.

Secondly, further processing of the digital image can be used to automatically evaluate the vehicle, for example to support distance selling of used vehicles. Additional data such as vehicle age, mileage, number of previous owners and other value-determining factors can be included in the automated calculation of the vehicle value.

The tamper-proof and reliable documentation of a vehicle damage detection or vehicle evaluation is a particular advantage.

Another advantage is the modularity of the vehicle detection system. Depending on requirements, i.e. depending on quality specifications or special detection targets, the vehicle system can be equipped with different individual detection units from the group mentioned above.

In total, the vehicle detection system is based in particular on the fact that all sensors, in this case referred to as individual detection systems, are calibrated for one and the same coordinate system. The number and type of sensors is variable and not limited thanks to the system principle. The sensors detect object data several times since data detection is performed from different angular positions due to the rotational movement of the vehicle on the platform. Furthermore, the detection is performed several times due to the different individual detection systems. The resulting quality from the detected object data is increased, because even uncertain statements from a detection process can be used by adding further uncertain statements from one or more further detection processes.

In other words, the same point of the vehicle is detected several times in one dimension, but also in several dimensions. In this sense, a dimension is understood to be a kind of information that results from a property of the vehicle, such as a geometrical property or, for example, the presence or absence of an overpainting.

All object data, i.e. any information, are summarized to form an object point and primary object data (as spatial coordinate data x, y, z as well as saved data on properties) are formed. The primary object data and the secondary object data related to the same object point are represented as several layers, that is the reason for why this can also referred to as multi-layer information. Each layer contains different types of information. Each type of information can also be referred to as a dimension, that is the reason for why this is also called multidimensional detection, multidimensional information and/or multidimensional representation. Thanks to the multidimensionality, the viewer or, for example, a vehicle evaluator receives more information than through a purely spatial representation of the vehicle.

The result of the vehicle detection is provided as a digital image with several types of information such that the digital image is designed to represent a digital twin of the detected vehicle.

Thanks to the digital image as a digital twin it is possible to view the detected vehicle in a virtual reality format, i.e. in virtual reality. This concerns the level of man-machine-communication.

Thanks to the digital image as a digital twin it is also possible to further process the information aggregated in this image automatically, for example for performing a repair calculation. This concerns the machine-machine-communication.

According to an advantageous further development, the vehicle state detection system has a housing and the vehicle positioning unit is located inside the housing. The housing results in the advantage that that defined light conditions or infrared radiation conditions can be achieved for the detection processes and interference from light or heat sources are shielded in particular. This is advantageous for increasing the accuracy of the detected object data. At the same time, the environment and especially the personnel are protected from light, heat or laser sources of the individual detection systems. Preferably, the housing can simultaneously form all or part of the positioning unit of the object detection unit and define the positional relation of the individual detection systems. Preferably, the object detection unit is also located inside the housing.

In another advantageous further development, the vehicle state detection system additionally features an underfloor scanner, wherein the underfloor scanner is designed to detect object data of a vehicle's bottom side and to transmit them to the evaluation unit and wherein the evaluation unit includes the object data for generating the digital image.

This is based on the fact that the individual detection systems are arranged such that their detection area can easily detect the top, front, rear and both sides of the vehicle rotating on the platform, but the bottom side of the vehicle can only be detected to a limited extent.

Thanks to the underfloor scanner, the state of the vehicle's bottom side, also known as underbody, can be detected. This is advantageous in so far as, firstly, a higher informative value of the vehicle state detection is generally achieved and, secondly, functional components such as parts of the exhaust system, wheel suspension and similar components can also be detected, whose state is essential for the vehicle's state and, derived from this, for any repair assessments or vehicle evaluations.

According to another advantageous further development, the vehicle detection system additionally features a tire scanner such that object data of a tire are detected by means of the tire scanner and made available to the evaluation unit for being included when generating the digital image.

Thanks to the tire scanner, the profile condition of the vehicle tires can be detected in particular. As an option, the tire scanner can also be used to detect a tire type such that statements on the permissibility of the tires installed are also possible. The profile condition is an additional parameter that is included in an evaluation of the vehicle. In addition, statements can be made on the remaining service life of the tires and thus on when the tires should be replaced.

According to another further development, the vehicle state detection system features a passenger compartment scanner in addition. The passenger compartment scanner is also referred to as interior equipment scanner. Object data of the vehicle's passenger compartment are detected by means of the interior equipment scanner and made available to the evaluation unit for being included when generating the digital image. This makes both the color scheme and the condition of the passenger compartment available for generating the digital image.

The interior equipment scanner is able to function according to each detection process as explained for the individual detection systems of the object detection unit, such as 3D camera detection system, image camera detection system or infrared detection system. The interior equipment scanner can especially involve several parts and simultaneously apply several of these detection methods. The object points, for which object data are detected by the interior equipment scanner, are integrated into the uniform spatial coordinate system by the evaluation unit.

According to another further development, the vehicle state detection system features a comparison module. The comparison module is equipped with a database including data on a normative digital image. The database can be an internal or external database. An external database enables centralized data maintenance as an additional advantage. The normative digital image describes a vehicle of the same type corresponding to the original manufacturing condition.

The comparison module is designed to perform a comparison between the digital image and the normative image and to generate a digital difference image. The digital difference image describes the extent to which the state of the vehicle, whose vehicle state is recorded, differs from the original manufacturing condition. The digital difference image thus shows possible damages in particular. Thus, a damage report, for example, can be output. Moreover, this vehicle state information can also form the basis for statements on necessary repairs or on the value of the vehicle in question.

According to another further development, the vehicle detection system includes a repair calculation module. The repair calculation module is equipped with a database including repair data, wherein the repair data contain data on spare parts, repair working hours and repair costs. The database can also be an internal or external database.

Data on spare parts include the spare parts needed for repairing specific damages. Data on repair working hours include the repair times required to perform a repair and are usually referred to as labor values. Data on repair costs indicate at what prices spare parts are available and at what prices repair work services are available. The repair costs are therefore preferably stored in the database as standard prices.

The repair calculation module is designed to create a repair evaluation based on the digital difference image and the repair data, wherein the repair evaluation shows the spare parts required for a repair, the repair working hours to be spent and the repair costs.

Thanks to this further development it is advantageously possible to obtain automated and tamper-proof statements on necessary repairs and their costs. Thus, cost estimates can be created automatically. As an advantage, considerable staff costs can be saved.

In an advantageous further development, it is furthermore possible to automatically trigger spare parts orders on the basis of the repair evaluation.

According to another further development, the vehicle state detection system features a value assessment module. The value assessment module comprises a database with vehicle price data. In this case, too, the database can be an internal or external database.

Vehicle price data are, for instance, list prices depending on the vehicle configuration, price tables depending on the vehicle age, mileage, number of previous owners and any additional price data.

The value assessment module is designed to generate a vehicle evaluation on the basis of the vehicle price data, the digital image, the digital difference image and the repair data. Depending on the state of the vehicle, the digital differential image may also show that no repairs are required. The repair data are then shown as a zero value such that the vehicle evaluation is not affected. According to this further development, a solution for determining the commercial value of a vehicle is advantageously provided that is automated and therefore requires little work, is tamper-proof and can be reliably documented.

The invention is explained in detail as a design example on the basis of the drawings.

DETAILED DESCRIPTION OF THE INVENTION

Figure 1:
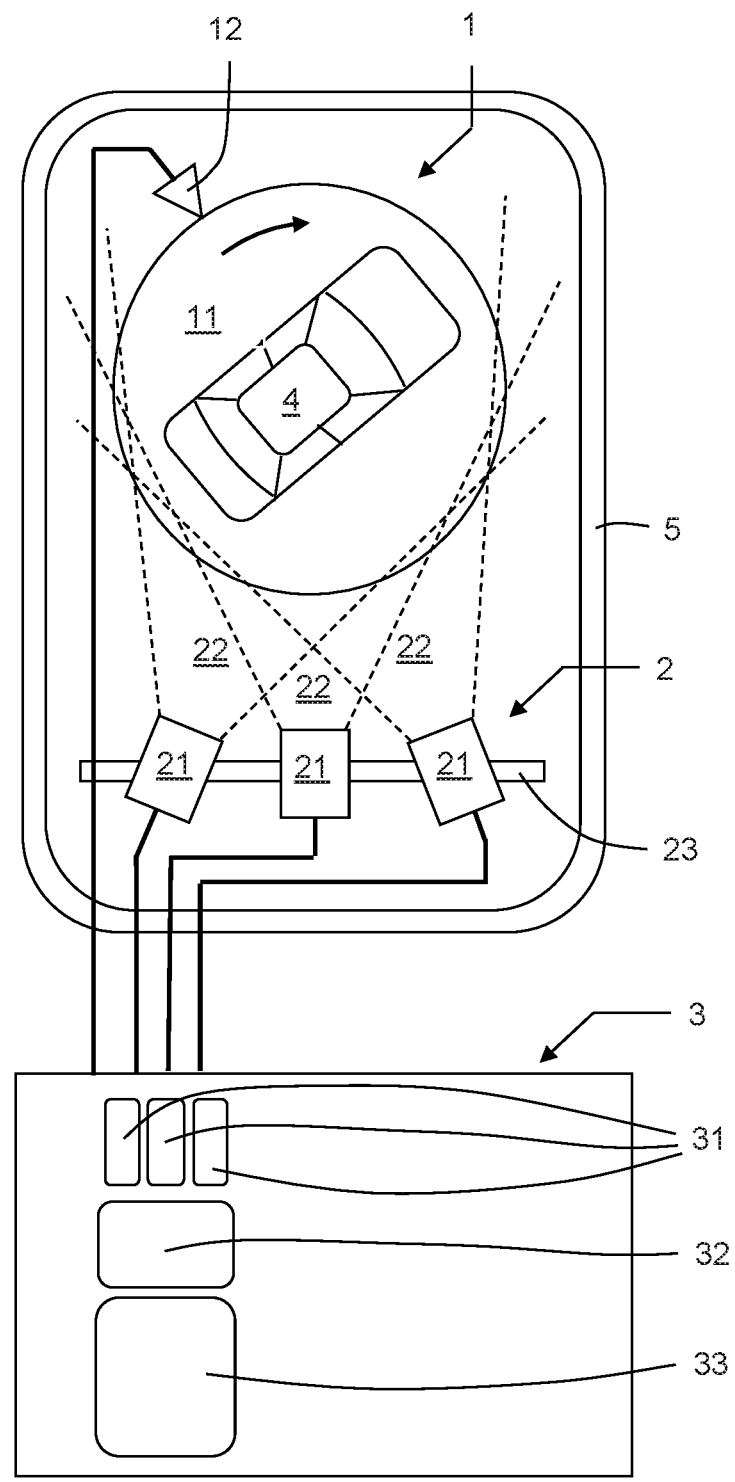
FIG. 1 shows a top view in schematic presentation.

FIG. 1 shows a first design example of a vehicle detection system according to the invention.

The vehicle positioning unit 1 has a rotatable platform 11 onto which a vehicle 4 can be positioned. The rotation capability of the platform 11 is illustrated by the arrow. The rotational position and thus the angular position of the platform 11 is detected by the platform position detection unit 12 and transmitted to the evaluation unit 3.

In the design example, the object detection unit 2 has three individual detection systems 21, each with a detection area 22. The detection area 22 is oriented such that the vehicle 4 located on the platform 11 is covered. The design example shows that the detection areas 22 overlap. The individual detection systems 21 are rigidly mounted on a positioning unit 23, which is designed as a rack. Rigid mounting ensures that after calibration, all object data detected by the individual detection systems on the object points of the vehicle can be assigned to a uniform spatial coordinate system. The single detection systems 21 in the design example are a 3D camera detection unit, an image camera detection unit and an infrared detection unit.

In a particularly advantageous design example, modified compared to the design example shown in FIG. 1, the object detection unit has five individual detection units, namely a 3D camera detection unit, an image camera detection unit, an infrared detection unit, a deflectometry detection unit and a pattern light projection detection unit.

In the design example shown in FIG. 1, both the vehicle positioning unit 1 and the object detection unit 2 are located within a housing 5. This has an opening that can be closed (not shown in FIG. 1) through which the vehicle 4 can be driven in the interior on the platform 11 and driven out again after detection. In the design example, the object detection unit 2 also has means for lighting vehicle 4 with defined luminous intensity and defined color temperature to increase the precision of the object data. The means for lighting are not shown in FIG. 1.

Furthermore, the design example according to FIG. 1 has an evaluation unit 3. In the design example, the evaluation unit 3 is a computer system.

Each of the three individual evaluation modules 31 of evaluation unit 3 receives the object data from the respectively assigned individual detection system 21 of the three individual detection systems 21 via data lines. All data lines from the single detection systems 21 and from the platform position detection unit 12 to the evaluation unit 3 are shown without reference signs. The individual evaluation modules 21 perform an evaluation of the quality of the object data. A quality value of the detection quality is preset for this purpose. If the object data reach or exceed the set quality value, the object data are precategorized as usable object data and transferred to the overall evaluation module 32. If the object data do not achieve the set quality value, the object data are precategorized as non-usable object data and are not forwarded. This ensures that only sufficiently reliable object data are included in the digital image to be formed later such that the digital image also has a high degree of reliability.

In the overall evaluation module 32, the usable object data are assigned to each other based on the coordinate data of the object points. This assignment is based on the fact that the evaluation unit 3 can assign all individual detection systems 21 to a uniform spatial coordinate system by means of the defined position of the individual detection systems 21 through the positioning unit 23 and the angular position of the platform 11 known with the help of the platform position detection unit 12 and thus of the placed vehicle 4. After successful assignment, the overall evaluation module 32 compares the quality value of the usable object data of each of the individual detection systems 21 with those of the other individual detection systems 21. In the comparison result, the compared usable object data are categorized according to their rank. The object data with the highest quality value receive the highest ranking. The object data with the highest ranking are categorized as primary object data. The object data with the lowest ranking are categorized as secondary object data.

The primary and secondary object data are transferred to generation module 33. The generation module assigns the coordinate data from the object data of the individual detection systems 21 to a uniform spatial coordinate system, taking the platform position data into consideration. On the basis of the primary object data, a basic digital image of the vehicle 4 is first generated in the uniform spatial coordinate system. The basic digital image of the vehicle 4 is now supplemented by adding the secondary object data with the help of the coordinate data to form a digital image of the vehicle 4. This digital image is provided ready for output. In the design example, the digital image is transferred as a file.

Figure 2:
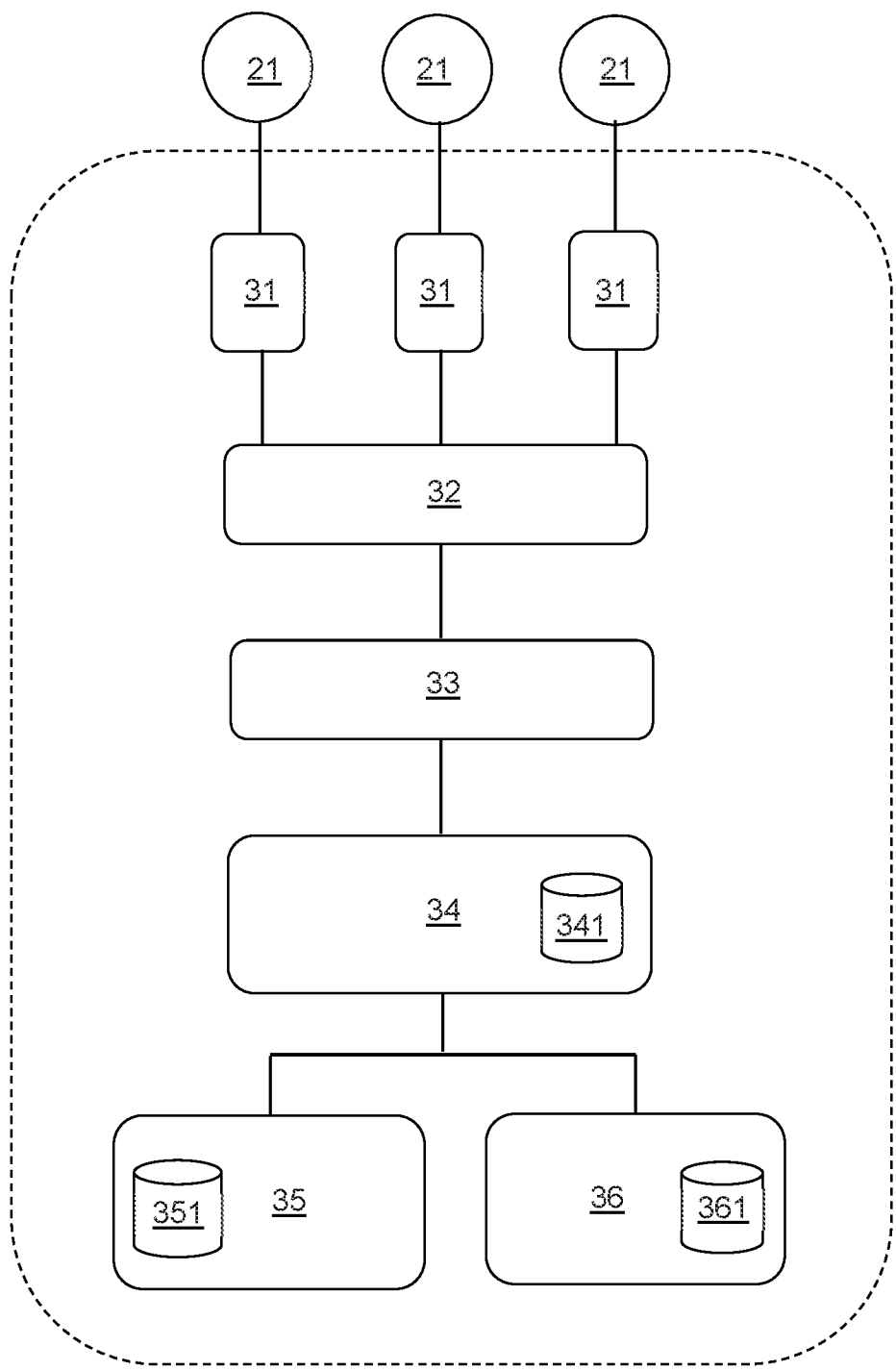
FIG. 2 shows a block diagram with repair calculation module and value assessment module.

FIG. 2 shows another design example in a block diagram, wherein both a repair evaluation and an evaluation of the vehicle can be carried out here.

For the detection units 21, the individual evaluation modules 31, the overall evaluation module 32 and the generation module 33, the explanations relating to the design example according to FIG. 1 apply accordingly.

After the digital image has been generated by the generation module 33, it is transferred to a comparison module 34 in the design example shown in FIG. 2. The comparison module 34 contains a database 341 as a database with data on normative digital images of many vehicle models in different configurations, also including the normative image of the detected vehicle 4. This database is regularly updated with new vehicle models appearing on the market. The comparison module 34 recognizes the vehicle model of the detected vehicle 4 on the basis of the digital image and performs a comparison between the digital image of the detected vehicle 4, which has been transmitted by the generation module 33, and the normative image of the corresponding model, which has been taken from database 341, and thus generates a digital difference image. The digital difference image contains information on deviations of the detected vehicle 4 from an originally manufactured vehicle such that damages in particular can be identified.

The digital difference image is made available to both the repair evaluation module 35 and, in parallel, to the value assessment module 36.

The repair calculation module 35 has a database 351 containing repair data. The repair data are model-related data on spare parts, repair working hours and repair costs, whereby the repair costs are stored as standard prices. On the basis of the digital difference image and the repair data, the repair evaluation module determines the spare parts required for performing a repair and the necessary repair working hours as well as the incurring repair costs according to the stored standard prices and outputs this as a repair evaluation.

In addition or as an alternative, the commercial value of the detected vehicle 4 can be determined using the value assessment module 36.

The value assessment module 36 comprises a database with vehicle price data for this purpose. The vehicle price data especially contain data on list prices and age- and mileage-dependent market prices of many vehicle models, whereby data on the model of the detected vehicle 4 are also included. The value assessment module 36 performs a vehicle evaluation based on the vehicle price data, the digital difference image and the repair data. As an option, supplementary vehicle data, such as the number of previous owners, can also be entered manually via the digital image and the digital difference image and taken into account by the value assessment module 36 when performing the vehicle evaluation.

REFERENCE SIGNS USED

1 Vehicle positioning unit
11 Platform
12 Platform position detection unit
2 Object detection unit
21 Individual detection system
22 Detection area
23 Positioning unit
3 Evaluation unit
31 Individual evaluation module 32 Overall evaluation module
33 Generation module
34 Comparison module
341 Database of the comparison module
35 Repair calculation module
351 Database of the repair calculation module
36 Value assessment module
361 Database of the value assessment module
4 Vehicle
5 Housing

The invention claimed is:

1. A vehicle state detection system, comprising:

a vehicle positioning unit;
an object detection unit; and
an evaluation unit;

said vehicle positioning unit having a platform and a platform position detection unit, said platform being constructed for placing a vehicle thereon, said platform being rotatable about an axis thereof, and said platform position detection unit being configured for detecting platform position data and providing the platform position data in a manner transmittable to said evaluation unit;

said object detection unit including two individual detection systems from a group consisting of:
a 3D camera detection system;
an image camera detection system;
an infrared detection system;
a laser triangulation detection system;
a pattern light projection detection system; or
a deflectometry detection system;

each individual detection system having a detection area, wherein the detection area covering sections of the platform and covering an area for the vehicle, a positioning unit defining a positional relation of said individual detection systems to one another and to said object positioning unit, said two individual detection systems for detecting object data of object points of the vehicle and providing the object data in a transmittable manner to said evaluation unit, the object data containing coordinate data of the object points;

said evaluation unit including respective evaluation modules for each of the at least two individual detection systems, an overall evaluation module and a generation module;

each of said individual evaluation modules being configured for an evaluation of a detection quality of the object data and setting a quality value, on the basis of the evaluation, performing a pre-categorization as usable object data when an adjustable quality value of the detection quality is achieved or as non-usable object data when the quality value falls below the adjustable quality value, and each said individual evaluation module being configured for providing the usable object data to said overall evaluation module in a transmittable manner, wherein the usable object data is assigned to one another by using the coordinate data for the object points, wherein a comparison of the quality value of the usable object data of an individual detection system of said two individual detection systems with a further quality value of the usable object data of a further individual detection system of said two individual detection systems is performed, wherein a ranking categorization of the usable object data of said individual detection systems is performed as primary object data and as secondary object data depending on the quality value and the further quality value;

said generation module being configured for assigning the coordinate data from the object data of said individual detection systems, also integrating the platform position data, to a uniform spatial coordinate system for generating a basic digital image of the vehicle on the basis of the primary object data, for providing a digital image by supplementing the basic digital image of the vehicle by adding the secondary object data on the basis of the coordinate data, and for providing the digital image in a manner capable for being output.

2. The vehicle state detection system according to claim 1, further comprising a housing, said vehicle positioning unit being located inside said housing.

3. The vehicle state detection system according to claim 2, further comprising an underfloor scanner for detecting object data of a vehicle's underside and making the object data available to said evaluation unit for inclusion when generating the digital image.

4. The vehicle state detection system according to claim 3 further comprising a tire scanner for detecting object data of a vehicle's tire and making the object data available to said evaluation unit for inclusion when generating the digital image.

5. The vehicle state detection system according to claim 4, further comprising an interior equipment scanner for detecting object data of the vehicle's passenger compartment and making the object data available to said evaluation unit for inclusion when generating the digital image.

6. The vehicle state detection system according to claim 5, further comprising a comparison module including a database with data relating to a normative digital image, said comparison module being configured for performing a comparison between the digital image and the normative image and to generating a digital difference image.

7. The vehicle state detection system according to claim 6, further comprising a repair calculation module, said repair calculation module having a database with repair data, the repair data including data on spare parts, repair working hours, and repair costs, said repair calculation module being configured for generating a repair evaluation on the basis of the digital difference image and the repair data, the repair evaluation including spare parts required for a repair, repair working hours to be spent and repair costs.

8. The vehicle state detection system according to claim 7, further comprising a value assessment module having a database with vehicle price data and said value assessment module being configured for generating a vehicle evaluation on the basis of the vehicle price data, the digital difference image and the repair data.

* * * * *